United States Patent [19]

Mefferd

[11] 4,384,511

[45] May 24, 1983

[54] HYDRAULIC CYLINDER

[76] Inventor: Roy J. Mefferd, 219 W. Myrtle St., Laurens, Iowa 50554

[21] Appl. No.: 197,767

[22] Filed: Oct. 17, 1980

[51] Int. Cl.[3] .......................... F01B 31/00; F16J 15/18

[52] U.S. Cl. .......................................... 92/164; 92/168

[58] Field of Search .......................... 92/164, 163, 168

[56] References Cited

U.S. PATENT DOCUMENTS

| | | | |
|---|---|---|---|
| 603,043 | 4/1898 | McIntosh | 92/164 |
| 2,451,089 | 10/1948 | Hunter | 92/168 |
| 2,682,256 | 6/1954 | Bowman | 92/164 |
| 3,777,627 | 12/1973 | Goade | 92/168 |
| 4,003,297 | 1/1977 | Mott | 92/168 |

*Primary Examiner*—Paul E. Maslousky
*Attorney, Agent, or Firm*—Zarley, McKee, Thomte, Voorhees & Sease

[57] ABSTRACT

An improved hydraulic cylinder has built-in variable adjustments for allowing selectively adjustable orientation of the barrel and hydraulic port thereon with respect to the bottom clevis and the hydraulic port thereon. The two hydraulic ports or connectors can be rotated to various orientations with respect to one another, merely by unthreading and loosening a locking collar, rotating the bottom clevis to the desired position, and rethreading and tightening the locking collar.

2 Claims, 4 Drawing Figures

3.
3.
4.
4.

HYDRAULIC CYLINDER

BACKGROUND OF THE INVENTION

Perhaps one of the most convenient and most often used devices, particularly for use with farm and construction implements, is the hydraulic cylinder. However, when the hydraulic cylinder is used as an integral part of larger equipment structures to provide leverage for moving one member with respect to another, the location of the cylinder on the larger device is often solely dictated by the position of the hydraulic fluid connectors on the cylinder barrel and the orientation of the connector which attaches the interior end of the cylinder to the remaining structure. These fixed points, provide what are often disadvantageous limitations on the mounting position of the cylinder.

Therefore, it would be advantageous to provide a hydraulic cylinder which permits variable adjustment of the hydraulic fluid connector line so that it may be adjusted to allow more leeway in the mounting positions of the cylinder on the implements of which they form a part.

Further, it would be desirable to provide a hydraulic cylinder which permits variable rotational adjustment of the inlet and outlet hydraulic connectors with respect to one another.

One of these connectors is usually on the bottom clevis and one is usually on the barrel, and therefore, it would be desirable to adjust the rotational positions of the barrel and bottom clevis with respect to one another.

Therefore, it is a primary object of this invention to provide a hydraulic cylinder of improved versatility which permits variable adjustment of the bottom clevis and the cylinder barrel with respect to one another.

A further object is the provision of a device which permits the two hydraulic couplings to be rotated with respect to one another.

The manner of achieving each of the above mentioned objectives and advantages of the cylinder of this invention, as well as others, is accomplished by the hydraulic cylinder described below.

SUMMARY OF THE INVENTION

Figures 1, 2, 3, 4:
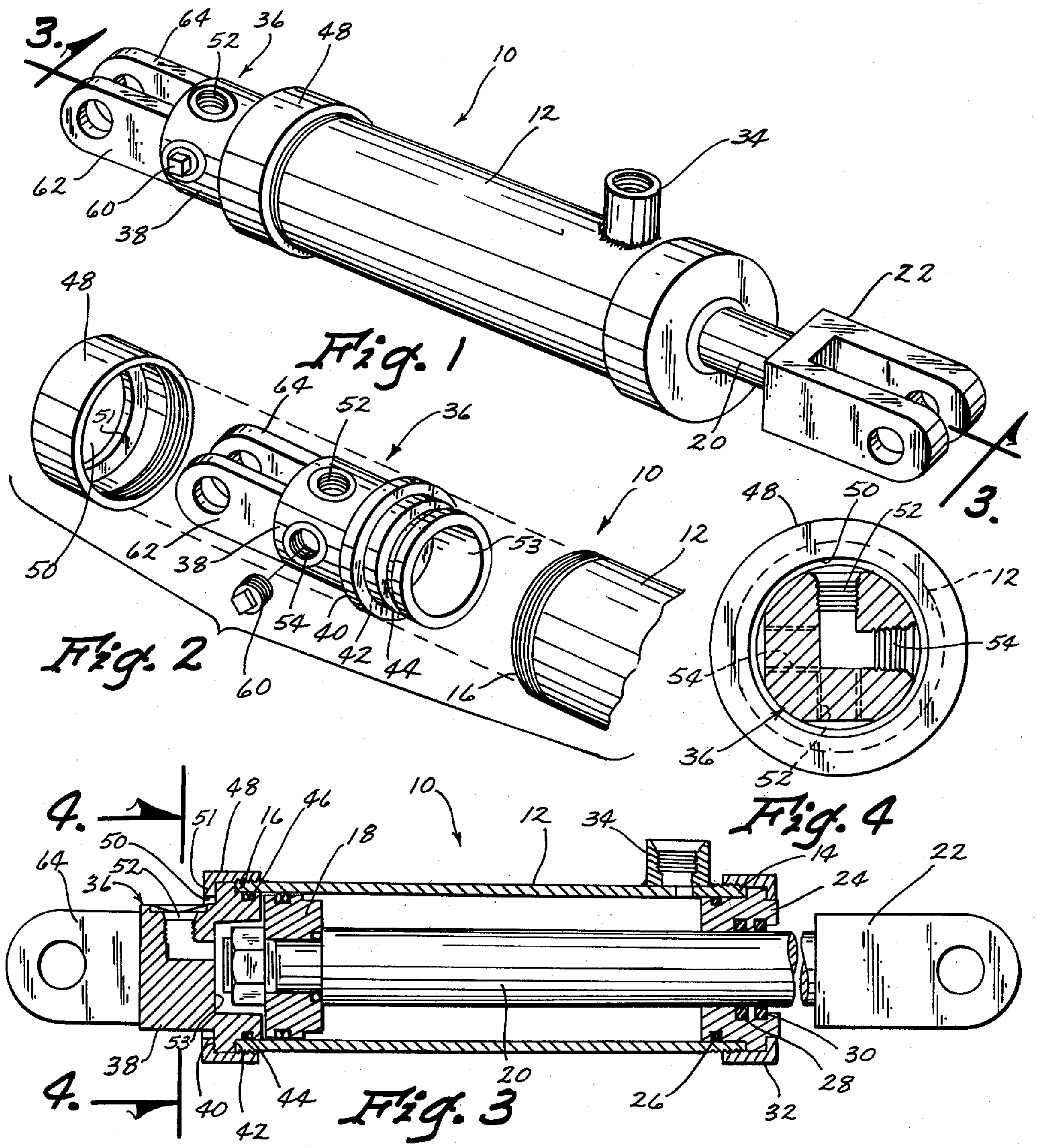
FIG. 1 is a perspective view of the improved hydraulic cylinder of this invention.
FIG. 2 is an exploded elevated view of the rear end portion of a hydraulic cylinder of this invention showing the component parts of the rear portion of the cylinder.
FIG. 3 is a cross-sectional view along the longitudinal axis of the cylinder taken along line 3—3 of FIG. 1.
FIG. 4 is a sectional view along line 4—4 of FIG. 3 showing the interior of the rear cylinder plug.

This invention relates to an improved and more versatile hydraulic cylinder. The primary improvements allowing the increased versatility of the cylinder of this invention are that the bottom clevis of the cylinder may be selectively adjusted and oriented with respect to the orientation of the cylinder barrel; and, secondly, that one of the hydraulic fluid connectors for the cylinder is rotatable to selectively adjust its orientation and/or alignment with respect to the other of the hydraulic fluid, connector openings. These two features allow for increased versatility of the cylinder in that it may be more freely adjusted in terms of its location on implement structures.

DETAILED DESCRIPTION OF THE INVENTION

The improved cylinder, generally depicted at 10, is comprised of a cylinder barrel 12 having a forward barrel end 14 and a rear barrel end 16, both of which are threaded. Positioned in conventional fashion within barrel 12 is piston 18 which is attached to piston rod 20. Rod 20 protrudes out the forward end 14 of barrel 12 and has attached to its outer extremity clevis 22. Cylinder plug 24 fits within the forward end portion 14 of barrel 12 and O-rings 26, 28 and 30 provide for effective seals between plug 24 and the interior wall portion of barrel 12 (ring 26), and the piston rod 20 and plug 24 (sealing rings 28 and 30). Front cap 32 threadably receives the forward barrel end portion 14 as depicted.

Barrel 12 has, positioned near its forward end, but behind front cap 32, a conventional hydraulic fluid connector 34 which provides for hydraulic fluid connection between a hydraulic fluid line and the interior of barrel 12.

Turning now to a description of the rear portion of the cylinder, it can be seen that barrel 12 terminates in a threaded rear or bottom barrel end portion 16.

Fitting within the rear open end of barrel 12 is a rear or bottom end plug generally depicted at 36.

Plug 36 has a central stem portion 38 which in cross-section steps radially outwardly at its forward end to define a first shoulder 40 and then steps radially inwardly to define a second shoulder 42. Forwardly of shoulder 42 is an annular groove 44 for receiving an O-ring 46 which provides a sealing relationship between plug 38 and rear barrel end 16 in order to prevent leaking of hydraulic fluid. Second shoulder 42 fits abuttingly against the rear barrel end 16. A locking collar 48 includes a central opening 50 and a radially inwardly extending flange 51. Collar 48 fits over stem portion 38 and is threadably received on the rear barrel end 16 with flange 51 abutting shoulder 40 of end plug 36 to releaseably clamp rear end plug 36 in position when collar 48 is screwed tightly against first shoulder 40.

Central portion 38 of plug 36 includes a hollow cavity 53 at its forward end in communication with the interior of barrel 12. Central portion 38 also is provided with a pair of radial plug openings 52, 54, each of which may receive a plug 60 as shown in opening 54 or which may receive a hydraulic connector from a hydraulic line. Plug 60 may be removed from each of openings 52, 54, to provide access for attaching a hydraulic connector line.

Rigidly attached to the top of center plug portion 38 are spaced apart pin receiving bottom clevis arms 62 and 64.

In actual operation, the device of the invention works as follows: The clevis 22 is attached to provide a linkage to any suitable implement structure. Collar 48 is unscrewed so that rear end plug 36 is freely rotatable within the rear barrel end 16 of barrel 12. Plug 36 is then freely rotated to a desired position to permit coupling 34 to have the desired orientation with respect to clevis arms 62, 64 and with respect to plug openings 52, 54. Thereafter, when plug 36 is placed in its desired orientation, collar 48 is tightened down against first shoulder 40 of plug 38 and it rigidly holds plug 38 in the desired orientation. Thereafter, pin receiving clevis arms 62 and 64 may be pinned to the remaining portion of the implement structure.

In this manner it can be seen that a hydraulic cylinder is provided which allows for increased versatility in that the orientation of pin receiving clevis arms 62 and 64 may be freely changed with respect to the orientation of barrel 12 and connector 34. Similarly, the rotational orientation of fluid connector 34 of barrel 12 may be freely changed with respect to either of the fluid connector passages 52, 54. Thus, a far more versatile cylinder is obtained.

It therefore can be seen that the invention accomplishes at least all of its stated objectives.

What is claimed is:

1. A hydraulic cylinder for an implement comprising:

a cylinder barrel having a longitudinal bore extending therethrough and at least one hydraulic coupling on the outer cylindrical surface thereof, said coupling being in fluid communication with the interior of said longitudinal bore;

first closure means on one end of said barrel for closing off said one end of said bore, said closure means having a rod receiving opening therein, said closure means comprising a first collar threadable received on said one end of said barrel;

a piston mounted within said bore for reciprocating movement therein;

a piston rod connected to said piston and slidably extending through said rod receiving opening of said first closure means;

a rod clevis mounted on one end of said rod outside said longitudinal bore;

second closure means mounted on the opposite end of said barrel for closing said opposite end of said bore;

said second closure means comprising a plug member rotatably mounted within said opposite end of said bore with at least a portion of said plug extending outside said bore, said portion outside said bore including clevis means for attachment to said implement;

said plug member having an annular flange thereon forming a first annular shoulder presented axially toward and abutting against said opposite end of said barrel and a second annular shoulder presented axially away from said opposite end of said barrel;

locking means comprising a second collar threadably received on said opposite end of said barrel, said second collar having a portion thereof engaging said second annular shoulder of said plug member and holding said first annular shoulder of said flange against said opposite end of said barrel;

said plug member having at least a first radial plug opening and a second radial plug opening providing communication from the interior of said bore to the exterior of said plug member, each of said openings having its own removeable plug for selective connection to a hydraulic line;

said second collar being selectively rotatable to loosen its hold on said plug member so as to permit rotational adjustment of said openings and said hydraulic coupling with respect to one another.

2. The device according to claim 1 wherein said first and second radial plug openings of said plug are perpendicular with respect to one another.

* * * * *